Feb. 23, 1937.  C. G. TRIMBACH  2,071,594
STREAMLINE MOUNT FOR MINIATURE BOMBS
Filed April 12, 1934  4 Sheets-Sheet 1
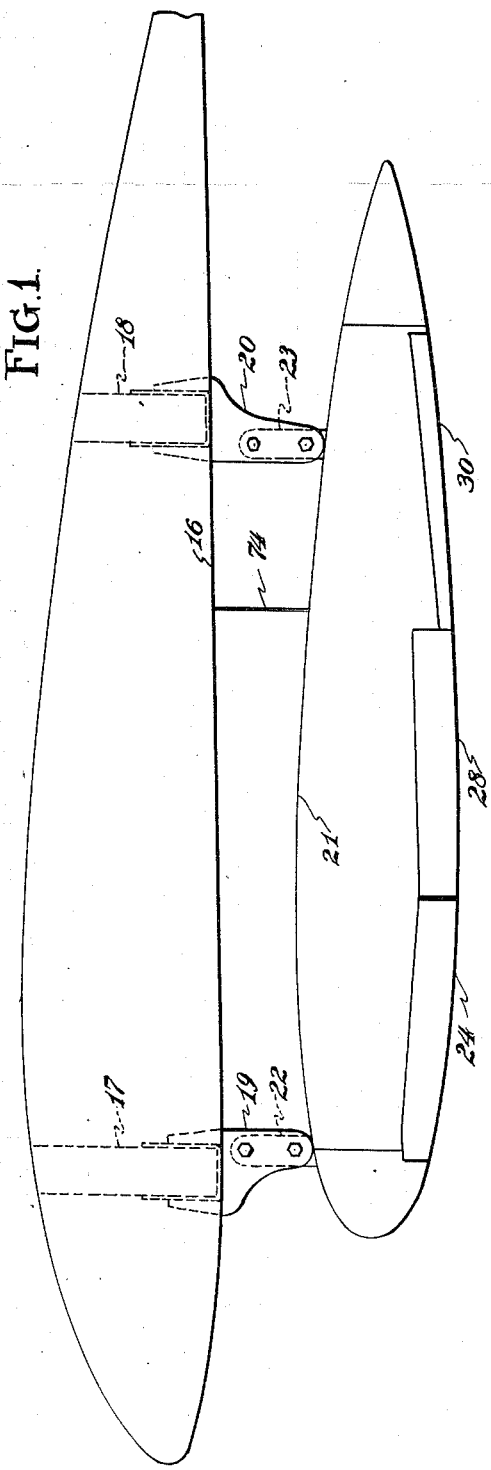
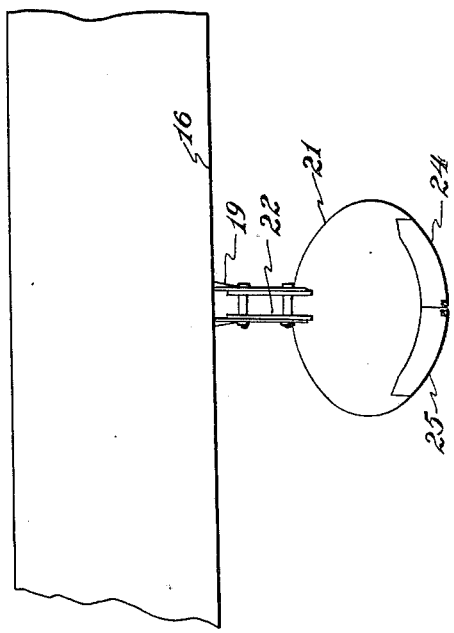
INVENTOR.
CLEM G. TRIMBACH.
BY
ATTORNEYS.

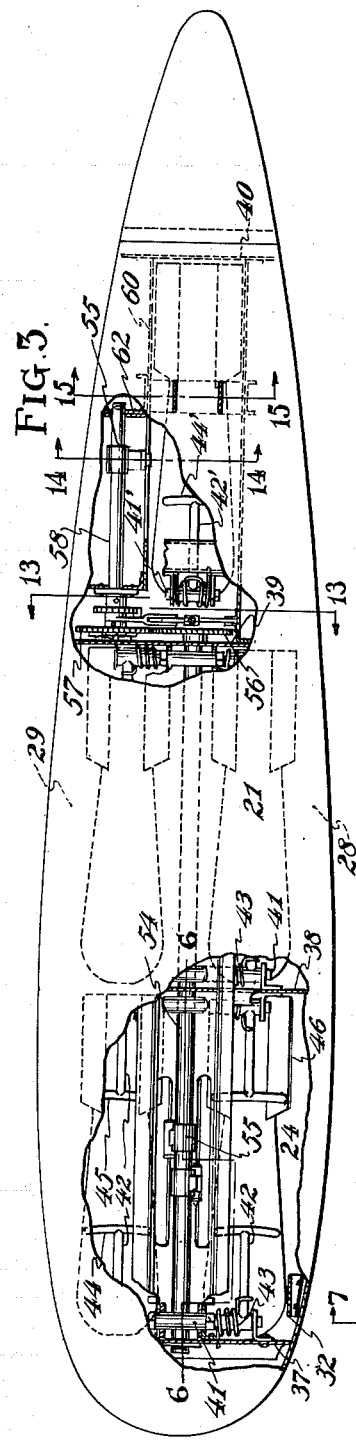
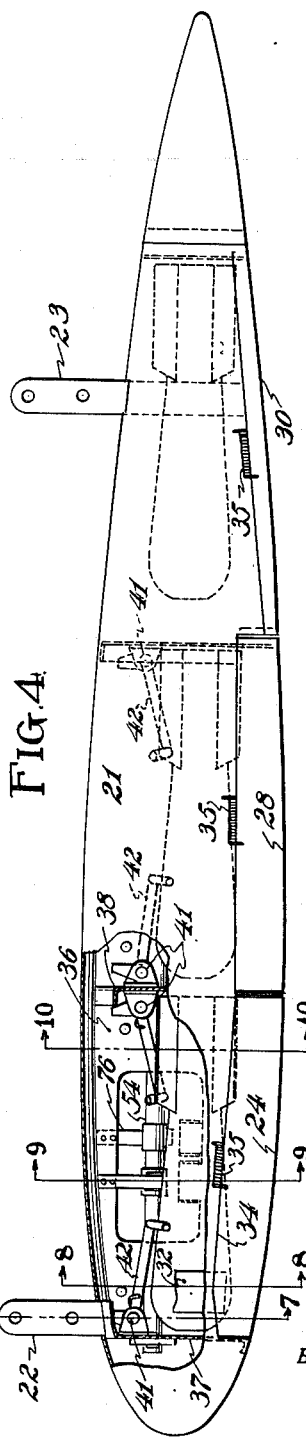
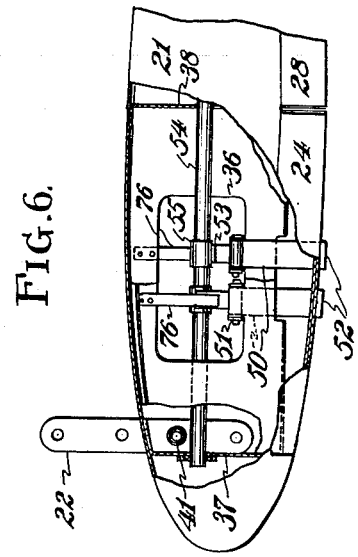
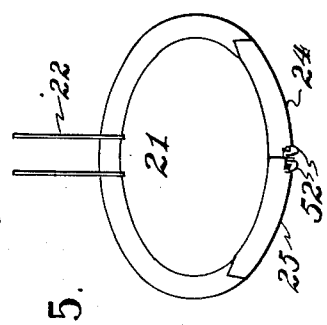

Feb. 23, 1937. C. G. TRIMBACH 2,071,594
STREAMLINE MOUNT FOR MINIATURE BOMBS
Filed April 12, 1934 4 Sheets-Sheet 3

INVENTOR.
CLEM G. TRIMBACH.
BY
ATTORNEYS.

Feb. 23, 1937.  C. G. TRIMBACH  2,071,594
STREAMLINE MOUNT FOR MINIATURE BOMBS
Filed April 12, 1934    4 Sheets-Sheet 4
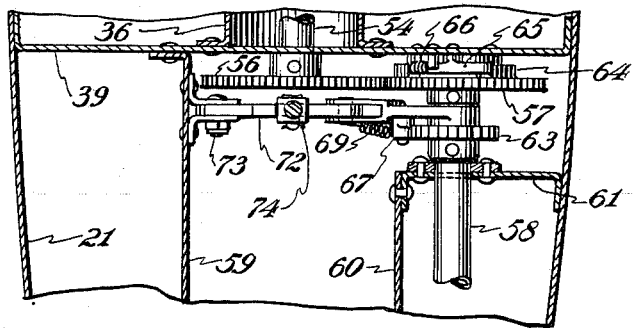
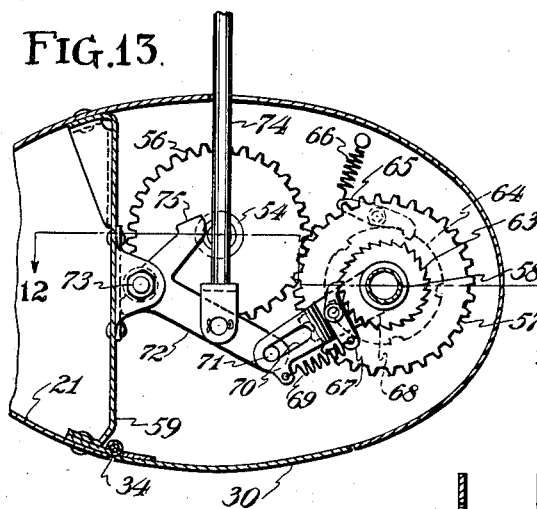
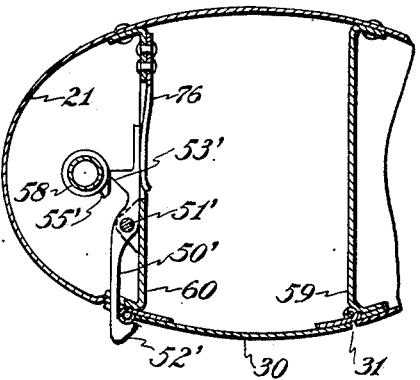
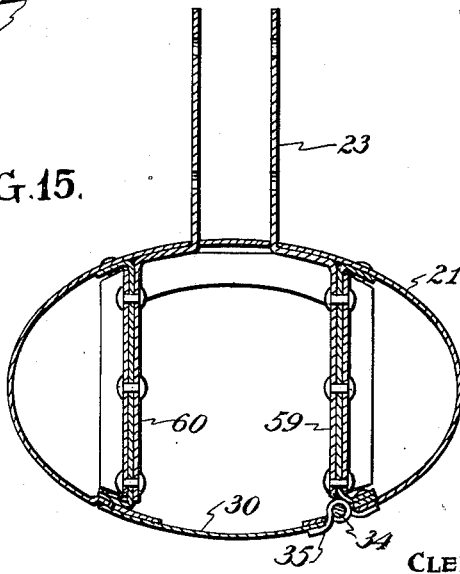
INVENTOR.
CLEM G. TRIMBACH.
BY
ATTORNEYS.

Patented Feb. 23, 1937

2,071,594

UNITED STATES PATENT OFFICE 2,071,594

STREAMLINE MOUNT FOR MINIATURE BOMBS

Clem G. Trimbach, Kenmore, N. Y., assignor, by mesne assignments, to Curtiss-Wright Corporation, a corporation of New York Application April 12, 1934, Serial No. 720,157

3 Claims. (Cl. 89—1.5)

This invention relates to aircraft armament, and is particularly concerned with a mount and rack for miniature bombs to be carried by aircraft.

Many military aircraft are equipped to carry one or more bombs which usually range in weight from one hundred to five hundred pounds. These bombs, of course, represent a substantial monetary outlay, and, when it is desired to practice bombing, the dropping of one of these large bombs is very expensive. Therefore, the subject device has been evolved to allow for the dropping of small bombs of only ten or fifteen pounds in weight for practice purposes. Concurrently with this device, a further advantage accrues, since a substantial number of the small bombs may be carried and all may be dropped consecutively in a single flight, thus allowing the aircraft crew to make five practice drops, where, if a large bomb were used, only one could be made on a single flight.

In order to prevent the alteration of the aerodynamic characteristics of the aircraft, the mount for the miniature bombs is made in the form of a streamlined body which may be attached to the aircraft externally thereof, in substantially the same position as would be occupied by a single larger bomb. In practice, one large bomb, for instance, might be carried below each wing of the craft near the fuselage. By the use of this invention, one practice bomb container may be mounted in place of the large bomb below each wing of the fuselage, and since each practice bomb container houses five practice bombs, ten of the small bombs can be dropped on a single flight.

The bomb container of this invention is also characterized by having trap doors through which each bomb passes when dropped, these trap doors having spring hinges whereby they return to a position flush with the body of the bomb carrier after dropping of the bomb. Thereby, the aerodynamic characteristics of the bomb carrier are not altered. The mechanism also includes means to positively eject each practice bomb upon release thereof, thus tending to prevent failure to release, which might be a likely cause of trouble due to the comparatively light weight of the bomb. Generally, the bomb carrier comprises a streamline body housing five bombs, two in side by side relationship in the forward part of the carrier, two in side by side relationship in the central part of the carrier, and one in the center rearward portion of the carrier. The bombs are carried horizontally, and are held within the carrier by an individual trap door for each, the doors having releasable locks which are consecutively operated by the operation of a single bomb release lever in the bomber's cockpit, in the conventional manner.

Objects of the invention are to provide a carrier for a plurality of miniature bombs; to provide a novel form of bomb holding and releasing mechanism; to provide means for positively ejecting the bombs from the carrier upon release thereof; to provide a carrier which will retain its streamline conformation for best aerodynamic characteristics both before and after release of one or more of the bombs; to provide a carrier for a plurality of miniature bombs which may be located externally of the aircraft in lieu of a single large bomb, said carrier occupying the same position in the aircraft as a single large bomb might occupy, and being attachable to the same fittings to which the releasing mechanism for the single large bomb is otherwise attached.

Further objects will be apparent from a reading of the subjoined specification and from an examination of the drawings, in which:

Fig. 1 is a side elevation of an aircraft wing having the bomb carrier of this invention suspended therebelow;

Fig. 2 is a front elevation of a portion of the wing with the bomb carrier suspended therebelow;

Fig. 3 is a plan partly broken away, of the bomb carrier, with the bombs mounted therein;

Fig. 4 is a side elevation, partly broken away, of the carrier;

Fig. 5 is a front elevation of the carrier;

Fig. 6 is a section on the line 6—6 of Fig. 3;

Figure 11:
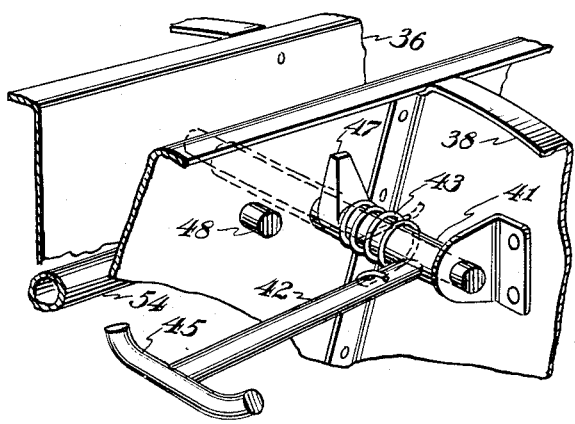

Figs. 7, 8, 9 and 10 are sections, respectively, on the lines 7—7, 8—8, 9—9 and 10—10 of Fig. 4;

Fig. 11 is a perspective view showing the mechanism for positively ejecting the bombs from the carrier;

Fig. 12 is a section on the line 12—12 of Fig. 13; and

Figs. 13, 14 and 15 are sections, respectively, on the lines 13—13, 14—14 and 15—15 of Fig. 3.

Figure 7:
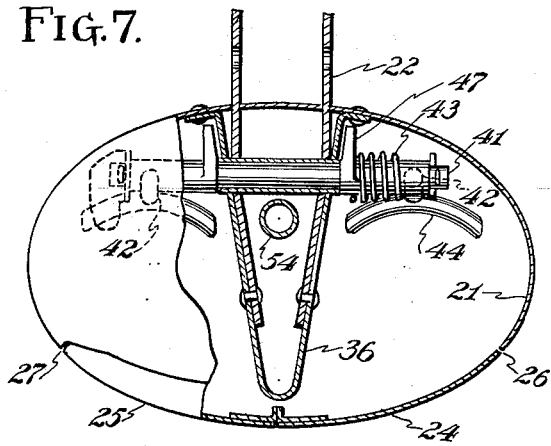
Figure 8:
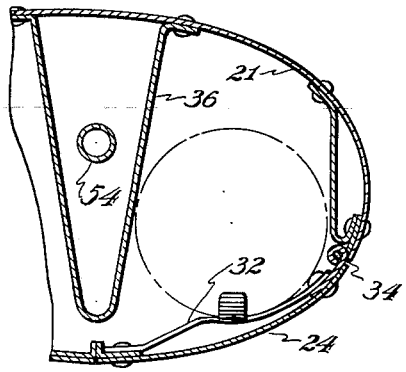
Figure 9:
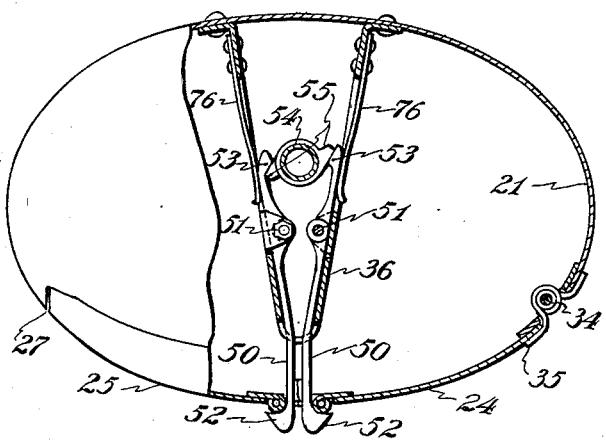
Figure 10:
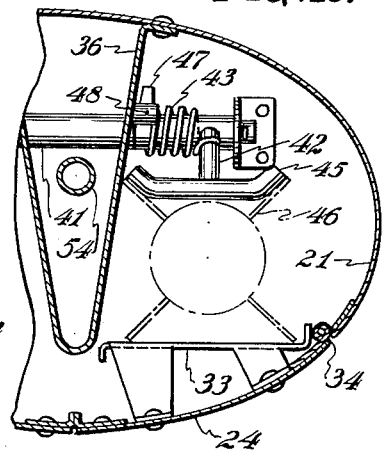

Referring more particularly to Figs. 1 and 2, 16 represents an aircraft wing having a forward spar 17 and a rearward spar 18 from which, respectively, bomb rack fittings 19 and 20 extend downwardly through the lower wing covering. To these fittings, a miniature bomb carrier 21 is fixedly attached, the carrier having lugs 22 and 23 bolted respectively to the fittings 19 and 20. The carrier 21, referring in addition to the other figures, is of hollow streamline conformation having an elliptical cross section. The lower portion of the carrier is provided with a plurality of trap doors, a pair of forward doors 24 and 25 being hinged at 26 and 27 toward the outer portions of the carrier. The inner edges of the doors 24 and 25 come together substantially at the plane of symmetry of the carrier 21. The mid portion of the carrier is provided with a pair of doors 28 and 29, hinged to the carrier in a manner similar to the forward doors. The rearward portion of the carrier, being somewhat narrower than the forward portion, is provided with a single door 30 centrally located, and hinged at 31 on one side of the plane of symmetry of the carrier. To the inner face of each door are attached suitable clips upon which a bomb may rest, Fig. 8 showing a clip 32 on which the forward round portion of the bomb may rest, and Fig. 10 showing a clip 33 upon which the rearwardly finned portion of the bomb may rest. Each of the several doors is mounted on a spring hinge, this being typically shown in Fig. 15 at 34, a spring 35 being organized to normally hold the door in a closed position flush with the outer surface of the bomb carrier. Within the carrier, a central V-shaped partition 36 extends from the nose of the carrier rearwardly to a point substantially in the plane of the rear edges of the doors 28 and 29, this partition defining the lateral compartments available through the doors 24 and 25, and 28 and 29. Longitudinally spaced bulkheads 37, 38, 39 and 40 are arranged laterally within the carrier to define the forward and rearward compartments occupied by the several bombs.

In the front and rear of the forward compartments defined by the bulkheads 37, 38 and 39, shafts 41 extend laterally and are borne by the V-shaped partition 36 and other suitable bearings. The ends of the shafts 41 extend transversely into the four forward bomb compartments and each end is provided with an arm 42 pressed downwardly by means of a spring 43. Those arms 42 at the forward end of each bomb compartment are provided with an arcuate end member 44 to bear upon the forward circular portion of a contained bomb, while those arms 42 toward the rearward end of each bomb compartment carry a cross member 45 with upturned ends adapted to engage against the fins 46 of a contained bomb. Each shaft 41 has a stop lug 47 which engages a pin 48 mounted on the partition 36, whereby the downward travel of the arms 42 is limited to the extent that said arms may not touch against the trap doors therebelow. It will thus be seen that, when a trap door is opened, a bomb may be inserted against the members 44 and 45 and pressed upwardly to tension the springs 43, whereupon, the trap door is closed to hold the bomb within the carrier. The springs 43 constantly tend to urge the bomb outwardly, so that, when the trap door is released, the bomb is ejected forcibly from the carrier.

The rearward bomb compartment, covered by the trap door 30, is also provided with cross shafts 41', carrying arms 42', and bomb engaging members 44' for ejection of the bomb in precisely the same manner as described above, except that the arms 42' are substantially in the plane of symmetry of the bomb carrier rather than being laterally spaced therefrom.

The mechanism for latching or locking the several trap doors is substantially the same for each bomb compartment, and comprises a catch 50 pivoted at 51 to the partition 36. The catch at its lower end has a hook 52 to engage the edge of the trap door opposite to the hinged edge. The catch is extended beyond the pivot 51 at its upper end to carry a cam follower 53. A shaft 54 is mounted within the V of the partition 36 for rotation and carries a plurality of cams 55 angularly spaced, one from the other, and each adapted to engage with one of the cam followers 53 on one of the several catches 50. This shaft 54 extends rearwardly to the bulkhead 39 and, as is shown in Figs. 3, 12 and 13, carries a gear 56 just aft of said bulkhead. This gear meshes with a similar gear 57 mounted on a shaft 58, said shaft extending rearwardly alongside the rearward single bomb compartment and has thereon a cam 55' engageable with a cam follower 53' carried by a catch 50' engageable with the rearward single door 30. Incidentally, the rearward bomb compartment available through the trap door 30, is defined by vertically extending partitions 59 and 60 on either side of the plane of symmetry of the carrier 21. The partition 59 extends from the bulkhead 39 rearwardly to the bulkhead 40, while the partition 60 extends rearwardly from a sub-bulkhead 61, rearwardly spaced from the bulkhead 39, to the bulkhead 40. The shaft 58 is borne by the bulkhead 39, the sub-bulkhead 61, and by a suitable outboard bearing 62 approximately halfway between the bulkheads 39 and 40.

The shaft 58 carries a ratchet wheel 63 rearwardly of the gear 57, and a second ratchet wheel 64 forwardly of the gear, the former ratchet wheel having a plurality of teeth, and the latter ratchet wheel having but five teeth, one of each said five teeth corresponding to a position of one or the other of the cams 55 for opening one or the other of the several trap doors. The ratchet wheel 64 is engaged by a pawl 65 spring-pressed thereagainst by means of a spring 66, said pawl 65 being pivoted on the bulkhead 39. The primary purpose of this pawl 65 is to prevent reverse rotation of the shaft 58. Forward rotation of the shaft 58 is induced by the engagement of a pawl 67 carried by an arm 68 swingable upon the shaft 58, said pawl 67 being pressed toward engagement with the teeth of the ratchet wheel 63 by means of a spring 69 carried by the arm 68. Said arm 68 is slotted at 70 at its outer end to receive a pin 71 carried by an operating lever 72 pivoted at 73 to the partition 59. Intermediate the length of the lever 72 is pivoted a rod 74. By upward pulling upon the rod 74, the arm 68 is rocked around the shaft 58, the pawl 67 engaging the ratchet wheel 63 to turn said shaft, thereby operating one or the other of the several cams 55. The geometrical relationship of this cam operating mechanism is so organized that when the pull on the rod 74 is exerted to the full extent as limited by a stop 75 on the lever 72, one-fifth of a revolution of the shafts 54 and 58 is effected, so that successive pulls on the rod will release successively, the five catches holding the several trap doors. When any one trap door is released by operation of a cam 55 upon a catch 50, the bomb ejecting mechanism including the arms 42, will forcibly thrust the bomb through the trap door against the comparatively light spring pressure exerted by the trap door hinges. After the bomb has left the carrier, the spring hinges will return the trap doors to their closed position and will latch themselves in place, each of the catches 50 being pressed by a spring 76 toward the trap door locking position. The rod 74 is carried upwardly through the top of the bomb carrier and into the aircraft to any suitable linkage, and terminates in a standard bomb releasing lever.

Briefly summarizing the operation of the bomb carrier unit, successive pulls on the operating rod 74 serve to successively operate each one of the five door catches 50, through the medium of the mechanism shown in Fig. 13, and the cams 55 carried by the shafts 54 and 58. Upon releasing of any one door, the spring-pressed ejecting arms 42 drive the bomb from the carrier. Thereafter, the trap door closes by virtue of its spring hinge, and latches itself.

For loading the carrier, the armorer simply pushes back each of the latch hooks 52 in turn, opens the corresponding trap door, inserts the miniature bomb, presses the bomb upwardly against the ejecting arms 42, and closes the door, whereupon the door latches itself and is ready for operation by the operating rod 74. By this construction, a very serviceable practice bomb carrier is attained, which may be easily loaded and inspected. Inspection may be made of the release operating mechanism through the rearward trap door 30, while inspection of the ejecting mechanism may be readily effected by peering through the trap door for the proper bomb compartment.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. A bomb carrier for aircraft bombs comprising an elongated streamline container of substantially circular cross-section, side by side doors in the main body of said container, and a single centrally disposed door in the tapering tail of said container, each said door providing a streamlined closure for an individual bomb compartment within said container, and means within each said compartment for forcibly ejecting a contained bomb through a predetermined path of travel upon opening of a respective door.

2. An aircraft bomb carrier comprising an elongated streamline container having a tapering rearward end, the carrier being of substantially circular cross-section, horizontally substantially coplanar means within said container for carrying a plurality of bombs and so arranged as to carry two bombs in side by side relationship in the forward part of the container, to carry two bombs in side by side relationship, tandem with the first pair, in the central part of the container, and to carry a single bomb rearward of said second pair in the tapering rearward end of said container.

3. An aircraft bomb carrier comprising an elongated streamline container having a tapering rearward end, the carrier being of substantially circular cross-section, means within the forward part of said carrier for carrying bombs in side-by-side relation, means in said carrier rearward of said first named means for carrying additional bombs in side-by-side relation, and means in said carrier in the tapering rearward end thereof to carry a single bomb centrally of said carrier.

CLEM G. TRIMBACH.